United States Patent
D'Alba et al.

(10) Patent No.: US 10,150,049 B2
(45) Date of Patent: Dec. 11, 2018

(54) SOLAR POWERED WATER PURIFICATION DEVICE WITH CYLINDRICAL STRUCTURE

(71) Applicants: Research Foundation of the City University of New York, New York, NY (US); Sun Fresh Water, LLC, Ormond Beach, FL (US)

(72) Inventors: Joseph James D'Alba, Ormond Beach, FL (US); George Victor St. Pierre, Ormond Beach, FL (US); Ali M. Sadegh, Franklin Lakes, NJ (US); Jorge E. Gonzalez, Baldwin, NY (US)

(73) Assignees: Research Foundation of the City University of New York, New York, NY (US); Sun Fresh Water, LLC, Ormond Beach, FL (US)

( * ) Notice: Subject to any disclaimer, the term of this patent is extended or adjusted under 35 U.S.C. 154(b) by 502 days.

(21) Appl. No.: 14/969,076

(22) Filed: Dec. 15, 2015

(65) Prior Publication Data

US 2016/0166946 A1    Jun. 16, 2016

Related U.S. Application Data

(60) Provisional application No. 62/186,779, filed on Jun. 30, 2015, provisional application No. 62/091,888, filed on Dec. 15, 2014.

(51) Int. Cl.
| | |
|---|---|
| *B01D 3/02* | (2006.01) |
| *B01D 1/00* | (2006.01) |
| *C02F 1/14* | (2006.01) |
| *B01D 5/00* | (2006.01) |

(52) U.S. Cl.
CPC ............. *B01D 1/0035* (2013.01); *B01D 3/02* (2013.01); *B01D 5/0066* (2013.01); *C02F 1/14* (2013.01); *Y02A 20/212* (2018.01)

(58) Field of Classification Search
CPC ...... B01D 1/00; B01D 1/0011; B01D 1/0029; B01D 1/0035; B01D 3/02; B01D 5/0066; C02F 1/14
See application file for complete search history.

(56) References Cited

U.S. PATENT DOCUMENTS

| | | |
|---|---|---|
| 2,402,737 A | 6/1946 | Delano |
| 3,501,381 A | 3/1970 | Delano |
| 4,055,707 A | 10/1977 | McDonald |

(Continued)

OTHER PUBLICATIONS http://mathworld.wolfram.com/HorizontalCylindricalSegment.html (accessed Jun. 22, 2018).*

(Continued)

*Primary Examiner* — Renee Robinson
*Assistant Examiner* — Derek N Mueller
(74) *Attorney, Agent, or Firm* — Peter J. Mikesell; Schmeiser, Olsen & Watts, LLP (57) ABSTRACT

A device for purifying water by solar power is described. The device has bottom and top sections, each being half-cylinders contacting one another along a flat edge to provide an elongated cylinder. The bottom section has an evacuated area with an optically transparent bottom surface that light can pass through to heat a liquid tray in the top section. A side-gutter directs water that condenses on an interior surface of the top section to an output port for collection.

19 Claims, 13 Drawing Sheets

(56) References Cited

U.S. PATENT DOCUMENTS

| | | | |
|---|---|---|---|
| 4,327,552 | A | 5/1982 | Dukess |
| 4,403,653 | A | 9/1983 | Davidson |
| 4,572,161 | A | 2/1986 | Mori |
| 4,921,580 | A | 5/1990 | Martes et al. |
| 5,053,110 | A | 10/1991 | Deutsch |
| 6,607,639 | B1 | 8/2003 | Longer |
| 6,761,802 | B2 | 7/2004 | Azimi |
| 7,067,044 | B1 | 6/2006 | Coon |
| 8,246,787 | B2 | 8/2012 | Cap et al. |
| 8,341,961 | B2 | 1/2013 | Glynn |
| 8,353,286 | B2 | 1/2013 | Li |
| 2010/0294266 | A1 | 11/2010 | Fung |
| 2014/0231327 | A1 | 8/2014 | D'Alba et al. |

OTHER PUBLICATIONS

Kalogirou, Soteris; Use of parabolic trough solar energy collectors for sea-water desalination; Applied Energy; 1998; pp. 65-88; vol. 60; Elsevier.

Al-Hayek, I. et al; The effect of using different designs of solar stills on water distillation; Desalination; 2004; pp. 121-127; vol. 169; Elsevier.

Ismail, Basel I.; Design and performance of a transportable hemispherical solar still; Renewable Energy; Jul. 2, 2008; pp. 145-150; vol. 34; Elsevier.

Murugavel, K. et al.; Performance study on basin type double slope solar still with different wick materials and minimum mass of water; Renewable Energy; Aug. 25, 2010; pp. 612-620; vol. 36; Elsevier.

Mahdi, J.T. et al.; An experimental wick-type solar still system: Design and construction; Desalination; Nov. 9, 2010; pp. 233-238 vol. 267; Elsevier.

Esfahani, J. et al.; Utilization of thermoelectric cooling in a portable active solar still—An experimental study on winter days; Desalination; Nov. 26, 2010; pp. 198-205 vol. 269; Elsevier.

Ahsan, A. et al.; Design, fabrication and performance analysis of an improved solar still; Desalination; Mar. 13, 2012; pp. 105-112 vol. 292; Elsevier.

Arunkumar, T. et al.; An experimental study on a hemispherical solar still; Desalination; Dec. 21, 2011; pp. 342-348 vol. 286; Elsevier.

Arunkumar, T. et al.; Experimental Study on Various Solar Still Designs; ISRN Renewable Energy; 2012; pp. 1-10; vol. 2012, Article ID 569381.

Forrest, E. et al.; Augmentation of nucleate boiling heat transfer and critical heat flux using nanoparticle thin-film coatings; International Journal of Heat and Mass Transfer; Oct. 31, 2009; pp. 58-67; vol. 53; Elsevier.

Chu, K. et al.; Structured surfaces for enhanced pool boiling heat transfer; Applied Physics Letters; Jun. 11, 2012; pp. 1-4; vol. 100; AIP Publishing.

You, S.M. et al.; Effect of nanoparticles on critical heat flux of water in pool boiling heat transfer; Applied Physics Letters; Oct. 20, 2003; vol. 83, No. 16; American Institute of Physics.

\* cited by examiner

SOLAR POWERED WATER PURIFICATION DEVICE WITH CYLINDRICAL STRUCTURE

CROSS-REFERENCE TO RELATED APPLICATIONS

This application claims priority to and is a non-provisional of U.S. Patent Application Ser. Nos. 62/091,888 (filed Dec. 15, 2014) and 62/186,779 (filed Jun. 30, 2015) the entirety of each of which is incorporated herein by reference.

BACKGROUND OF THE INVENTION

The subject matter disclosed herein relates to solar powered desalination devices. Governments in developing countries are challenged to provide sufficient amounts of potable drinking water to their population. In such countries water is often contaminated with salt or microorganisms which presents a health concern. While previous attempts have been made to provide potable water, none of these attempts have proven entirely satisfactory. These attempts often suffer from a lack of sufficient throughput or are too costly. Accordingly, alternative water purification devices are desired.

The discussion above is merely provided for general background information and is not intended to be used as an aid in determining the scope of the claimed subject matter.

BRIEF DESCRIPTION OF THE INVENTION

A device for purifying water by solar power is described. The device has bottom and top sections, each being half-cylinders contacting one another along a flat edge to provide an elongated cylinder. The bottom section has an evacuated area with an optically transparent bottom surface that light can pass through to heat a liquid tray in the top section. A side-gutter directs water that condenses on an interior surface of the top section to an output port for collection.

In a first embodiment, a device for purifying water by solar power is provided. The device comprises a bottom section and a top section, each being half-cylinders contacting one another along a respective flat edge to provide an elongated cylinder; the bottom section comprising a cover that defines the flat edge of the bottom section that is sealed to an optically transparent bottom surface to provide an evacuated area that has a pressure of less than one atmosphere; and the top section comprises a liquid tray that defines the flat edge of the top section, at least one side-gutter that directs water that condenses on an interior surface of the top section to an output port, the liquid tray further comprising an input port for adding water into the liquid tray.

In a second embodiment, a device for purifying water by solar power is provided. The device comprises a bottom section and a top section, each being half-cylinders contacting one another along a respective flat edge to provide an elongated cylinder; the bottom section comprising a cover that defines the flat edge of the bottom section that is sealed to an optically transparent bottom surface to provide an evacuated area that has a pressure of less than one atmosphere; and the top section comprises a liquid tray that defines the flat edge of the top section, the liquid tray being flanked by side-gutters that direct water that condenses on an interior surface of the top section to a front-gutter and through an output port, the side-gutters and the front-gutter at least partially circumscribing the liquid try, the liquid tray further comprising an input port for adding water into the liquid tray.

In a third embodiment, a device for purifying water by solar power. The device comprises a bottom section and a top section, each being half-cylinders contacting one another along a respective flat edge to provide an elongated cylinder; the bottom section comprising a cover that defines the flat edge of the bottom section that is sealed to an optically transparent bottom surface to provide an evacuated area that has a pressure of less than one atmosphere; the top section comprises an optically transparent dome, a liquid tray that defines the flat edge of the top section, the liquid tray being flanked by side-gutters that direct water that condenses on an interior surface of the optically transparent dome to front-gutter and through an output port, the side-gutters and the front-gutter at least partially circumscribing the liquid try, the liquid tray further comprising an input port for adding water into the liquid tray; and an array of lenses disposed above the top section.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 3D is a perspective view of side-gutters (shown in phantom) of the top section while

FIG. 4A is a cross section of the top section from the front showing relative placement of ports while

FIG. 7B is a top view of system showing the array of lenses while

DETAILED DESCRIPTION OF THE INVENTION

Figure 1:
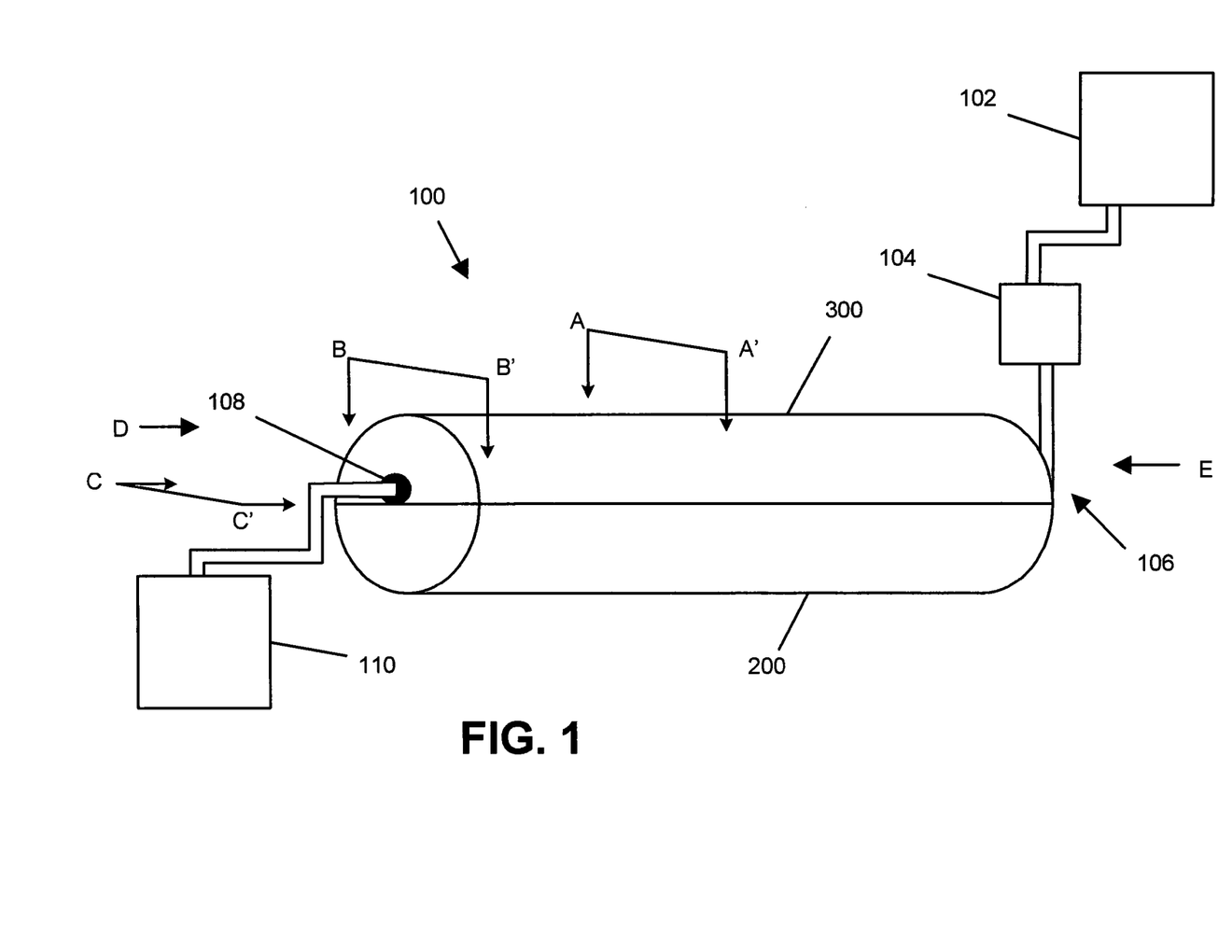
FIG. 1 is a perspective view of a system for purifying water by solar power.

Disclosed in this specification is a solar powered linear desalination tube (LDT) that renders salt water potable for human consumption. FIG. 1 depicts a linear dome solar water purifying device 100. The water purifying device 100 is generally cylindrical and comprises a bottom section 200 and a top section 300. A water reservoir 102 is provided that holds unpurified water. A water flow regulator 104 provides water from the water reservoir 102 to the water purifying device 100 through an input port 106 at a specific rate. The specific rate may be set, for example, by the rate at which the water purifying device 100 purifies water. Examples of suitable water flow regulators include float valves, drip house, spray mechanisms and soaker hoses. The water flow regulator functions to control the rate of water input to roughly correspond to the rate of purified water output. The water flow regulator 104 may be disposed inside of the water purifying device 100 (see FIG. 3A). After the water has been purified, potable water exits outlet port 108 and is collected in water collector 110 for subsequent use. The water purifying device 100 is shown in further detail in subsequent figures.

Figure 2A:
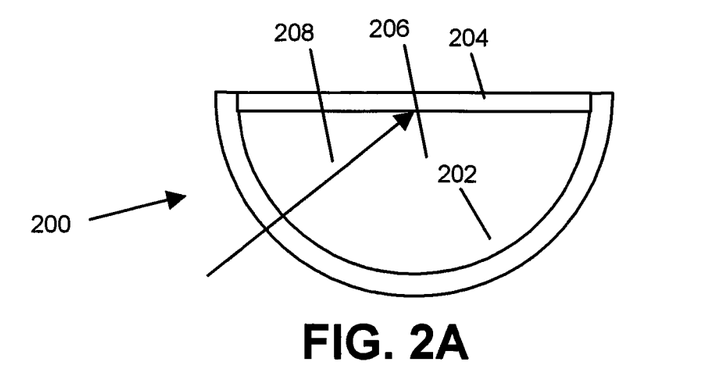
FIG. 2A, FIG. 2B, and FIG. 2C are cross section views of a bottom section of the system.
Figure 2B:
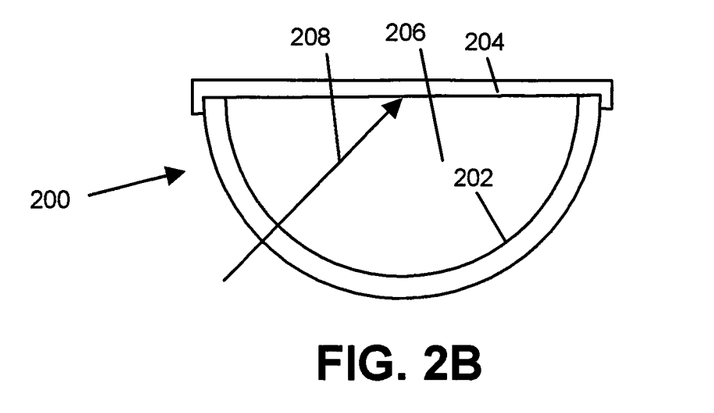
Figure 2C:
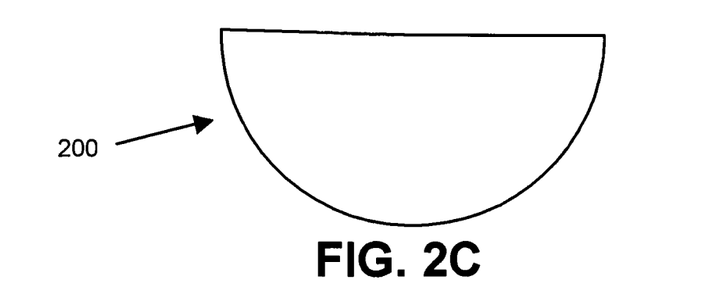

FIG. 2A depicts a cross section along line A-A' of FIG. 1 of the bottom section 200. The bottom section 200 comprises an optically transparent surface 202 and a cover 204. Suitable optically transparent materials include glass, acrylics (such as acrylics sold under the brand name PLEXIGLASS), polycarbonates (such as polycarbonates sold under the brand name LEXAN or MAKROLON) and other plastics. The cover 204 may be an optically transparent cover or an opaque, metallic cover that is thermally conductive. FIG. 2A and FIG. 2B differ in the mode of attachment of the cover 204. In FIG. 2A, the cover 204 is encompassed within the mouth of the optically transparent surface 202. In FIG. 2B, the cover 204 extends over the mouth of the optically transparent surface 202 to overhang a side of the optically transparent surface 202. An airtight sealant may be used to main a vacuum within the bottom surface 202. In another embodiment, the cover 204 of bottom section 200 and the bottom of top section 300 are monolithic and consist of aluminum or other metallic material that is sealed to the optically transparent bottom surface 202 to allow for evacuation of evacuated area 206. The cover 204 forms an airtight seal with the optically transparent surface 202 so as to form an evacuated area 206. The evacuated area 206 has been substantially evacuated of air such that the pressure within the evacuated area 206 is less than 0.8 atmosphere. In one embodiment, the pressure within the evacuated area 206 is less than 0.5 atmosphere. In another embodiment, the pressure within the evacuated area 206 is less than 0.1 atmosphere. Light 208 is transmitted through the optically transparent bottom surface 202 where it strikes the cover 204. In one embodiment, a parabolic mirror (see parabolic mirror 600 of FIG. 6) is used to direct the light 208. FIG. 2B is an end view of the bottom section 200 along line B-B' (see FIG. 1) showing a solid proximate end. The distal end of the bottom section 200 also has such a solid end.

Figure 3A:
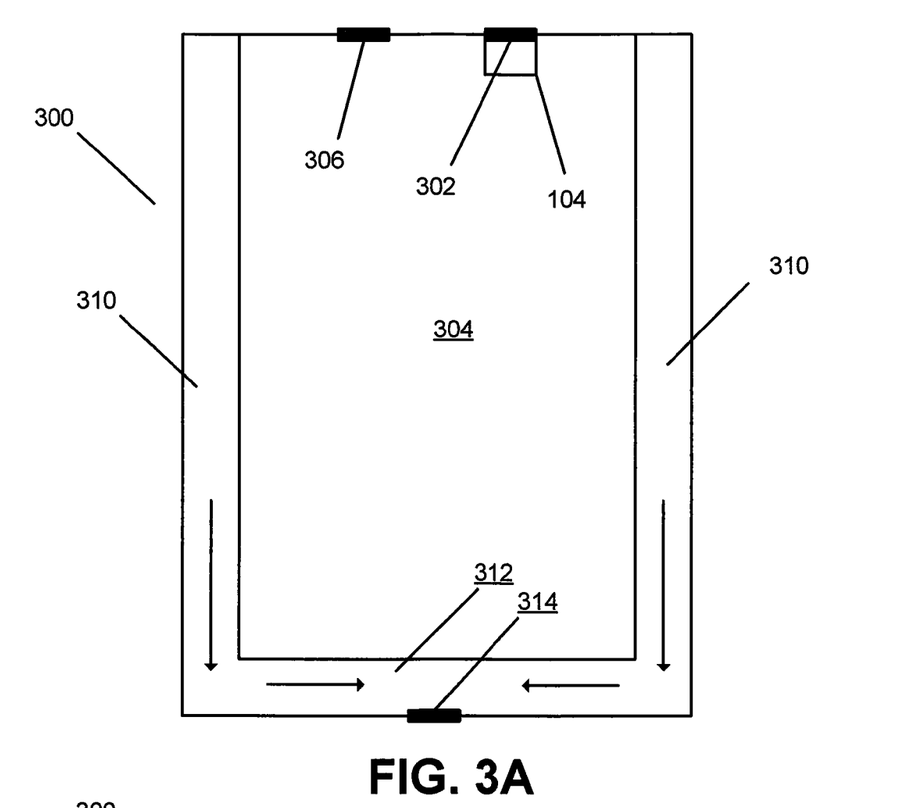
FIG. 3A is a cross section of a top section of the system from the top while FIB. 3B is a cross section of the top section from the side.
Figure 3B:
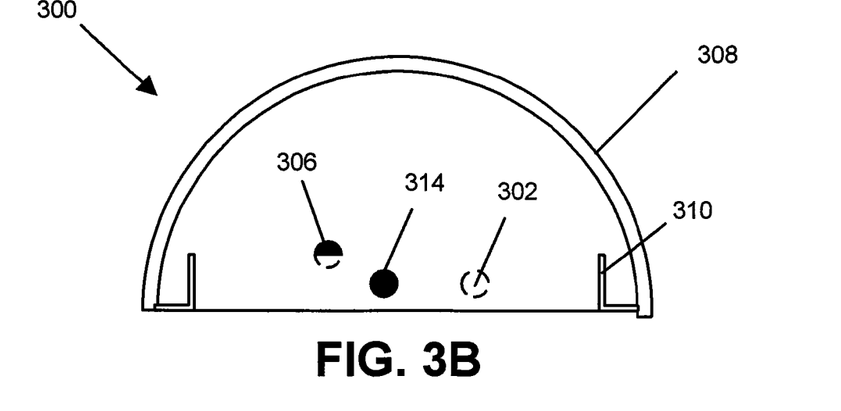
Figure 3C:
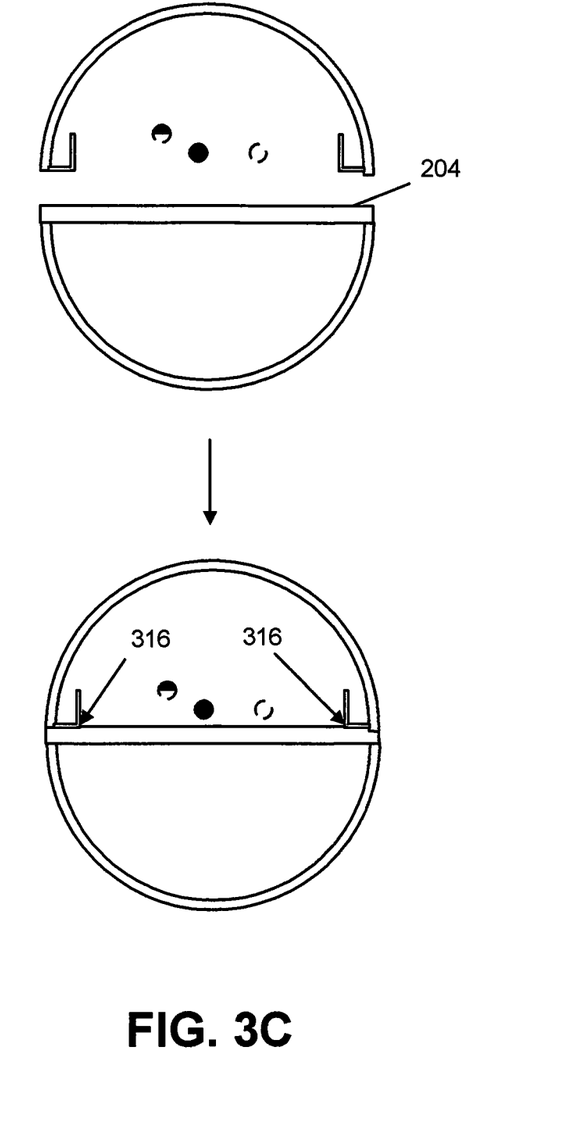
FIG. 3C is a cross section of the top section and bottom section being assembled.

FIG. 3A provides a cross section along line C-C' of FIG. 1 of the top section 300. FIG. 3B provides a cross section view of the top section 300 along line A-A' of FIG. 1. In use, water is introduced through input port 302 where it accumulates in liquid tray 304. The liquid tray 304 is a flat tray which may be a thermally conductive metal (e.g. aluminum) or an optically transparent material. In one embodiment, shown in FIG. 3B, the liquid tray 304 forms the bottom of the top section 300. In another embodiment, shown in FIG. 3C, the liquid tray 304 is formed by the cover 204 of the bottom section 200 by sealing a joint 316 with a suitable watertight sealant.

Figure 3D:
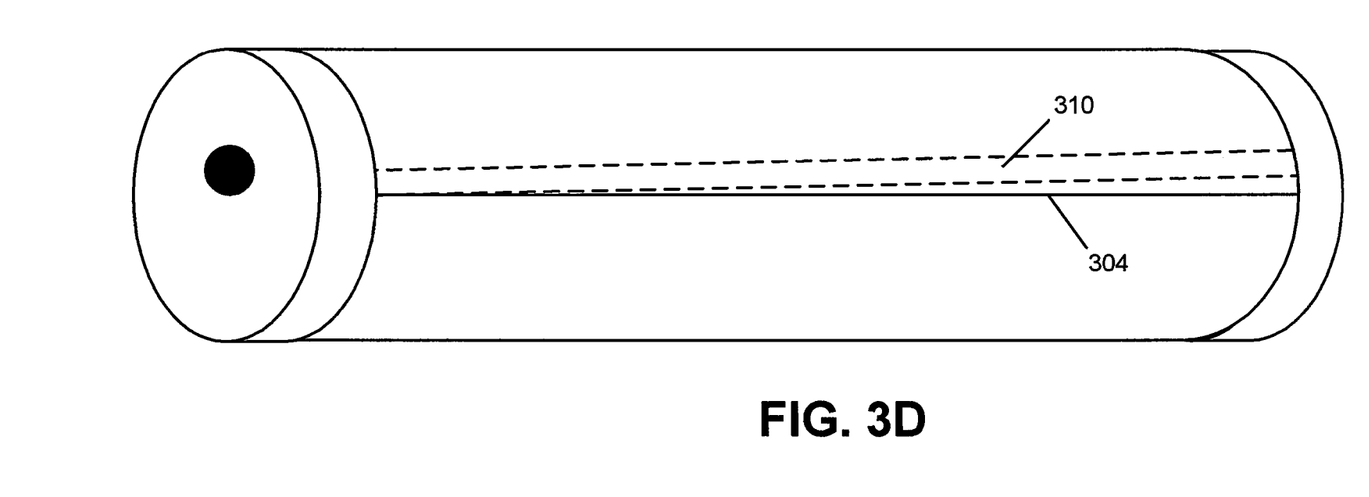
Figure 3E:
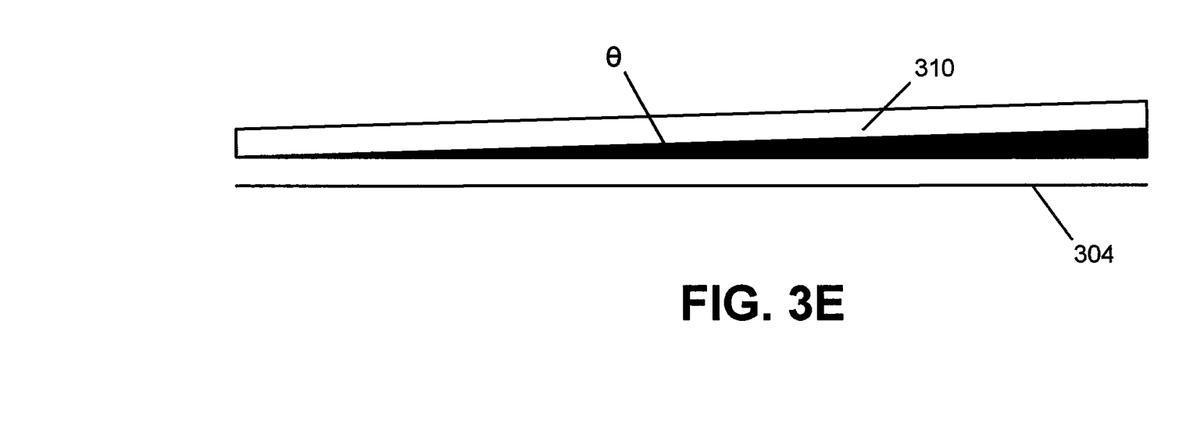
FIG. 3E is a profile view of the side-gutters showing an angle of offset.

In use, the light 208 (see FIG. 2A) heats the cover 204 which, in turn, heats the water in liquid tray 304. This causes a portion of the water to evaporate. The evaporated portion then condenses on an interior surface of a dome 308 (FIG. 3B) and accumulates in side-gutters 310. In one embodiment, the dome 308 is optically transparent. The side-gutters 310 extend the length of the top section 300 and are in fluid communication with a front-gutter 312. The side-gutters 310 and the front-cutter 312 extend perpendicular one another. In one embodiment, shown in FIG. 3D and FIG. 3E, the side-gutters 310 are inclined by an angle θ relative to the liquid tray 304. FIG. 3D is a phantom view of the side-gutters 310 and liquid tray 304 within the top section 300. FIG. 3E is a schematic profile showing the relative orientation of the side-gutters 310 and the liquid tray 304. The liquid tray 304 is roughly leveled such that water is generally contained. The angle θ guides water from the back of the side-gutters 310 toward the front-gutter 312. The angle θ may be greater than 0° and less than 60°. In one embodiment, the angle θ is greater than 0° and less than 45°. In another embodiment, the angle θ is greater than 0° and less than 20°. The output port 314 removes the condensed water from the front-gutter 312 for subsequent use. Excess water may be removed from the liquid tray 304 through an overflow port 306. In one embodiment, excess water is returned to the water reservoir 102.

Figure 4A:
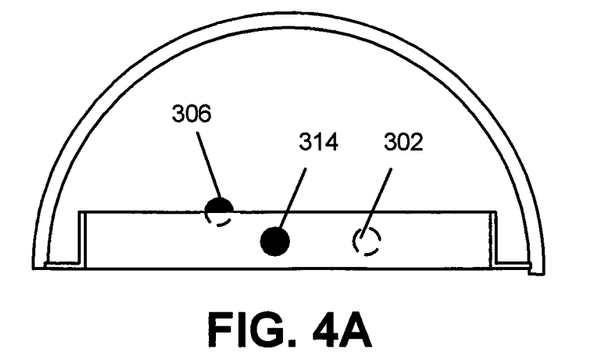
Figure 4B:
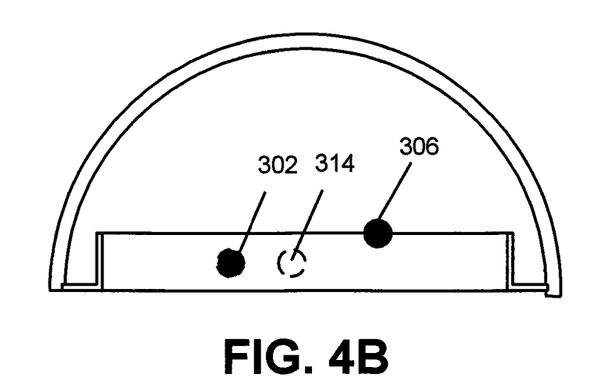
FIG. 4B is a corresponding cross section from the back.

As shown in FIG. 4A and FIG. 4B, the input port 302 and the overflow port 306 are vertically staggered. FIG. 4A depicts the device 100 from viewpoint D of FIG. 1. FIG. 4B depicts the device 100 from viewpoint E of FIG. 1. The input port 302 is vertically disposed below the top of the side-gutter 310. The overflow port 306 is above the input port 302 but at least partially below the top of the side-gutter 310 such that excess water in the side-cutter 310 will exit the overflow port 306 rather than introduce purified water back into the liquid tray 304.

Figure 4C:
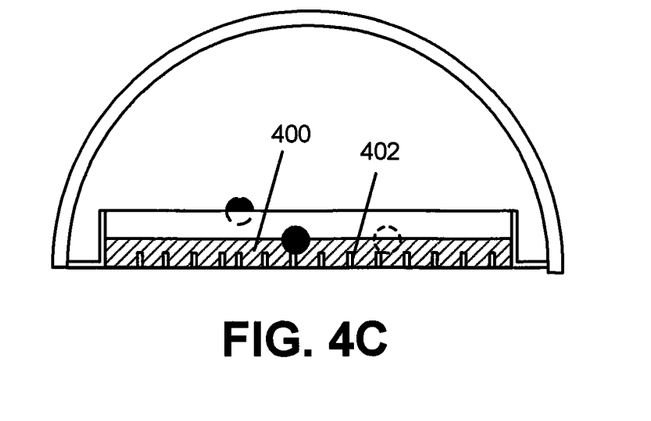
FIG. 4C is a cross section of the top section showing an absorbent material disposed within a liquid tray.
Figure 4D:
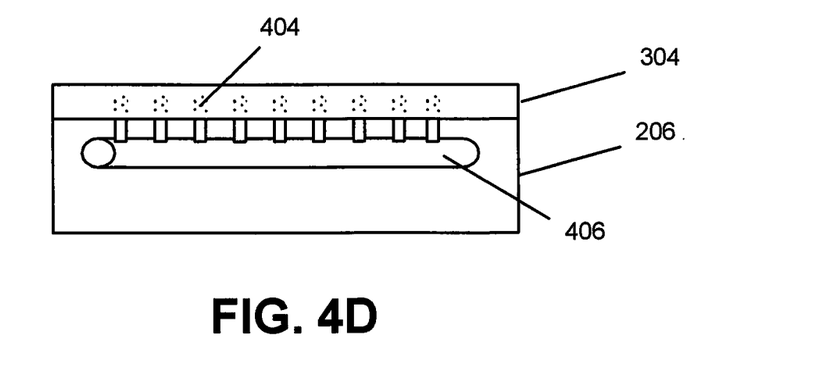
FIG. 4D is a cross section of the top section and the bottom section showing a horizontal tube in the bottom section and vertical tubes bridging between the top section and the bottom section.

In the embodiment of FIG. 4C, an absorbent material 400, such as an absorbent sponge, is provide that covers a bottom of the liquid tray 304. The absorbent material increases the exposed surface area of water within liquid tray 304 and facilitates evaporation. In the embodiment of FIG. 4C, the liquid tray 304 has a plurality of protrusions 402 extending from the bottom of the liquid tray 304 and increase the surface area of the bottom of the liquid tray 304. These protrusions 402 function as radiators and transmit heat to the surrounding medium with the increased surface area (either directly to the water or indirectly to the water by way of the absorbent material 400). In one embodiment, the protrusions 403 are elongated ribs that extend the length of the liquid tray 304. In another embodiment, the protrusions 403 are columns, such as spikes, that are arranged into rows. In one embodiment, shown in FIG. 4D, the bottom of the liquid tray 304 has a plurality of vertical metal tubes 404 (such as vertical copper tubes) that connect with one or more horizontal metal tubes 406 (such as a horizontal copper tube) that are suspended in the evacuated section 206. No water or other liquid need be contained within the horizontal metal tube 406, but the horizontal metal tube 406 absorbs heat from being suspended within the evacuated section 206. This heat transfers to the liquid tray 304 via the vertical metal tubes 404.

Figure 5A:
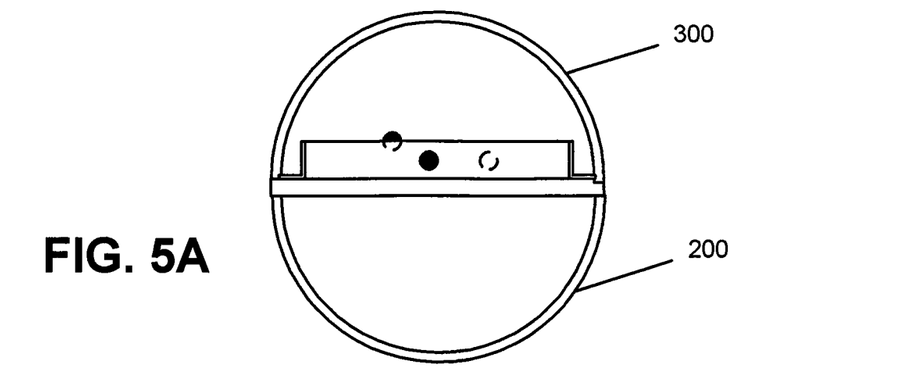
FIG. 5A, FIG. 5B and FIG. 5C are cross sections of the system showing different modes of connection between the top section and the bottom section.
Figure 5B:
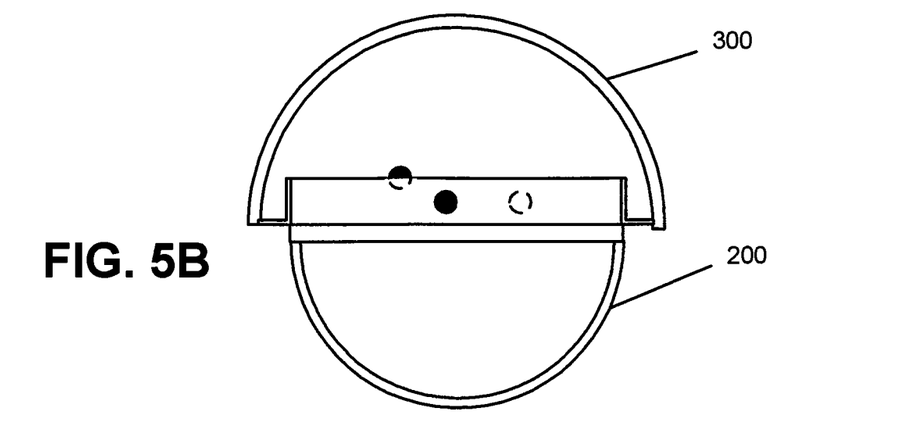
Figure 5C:
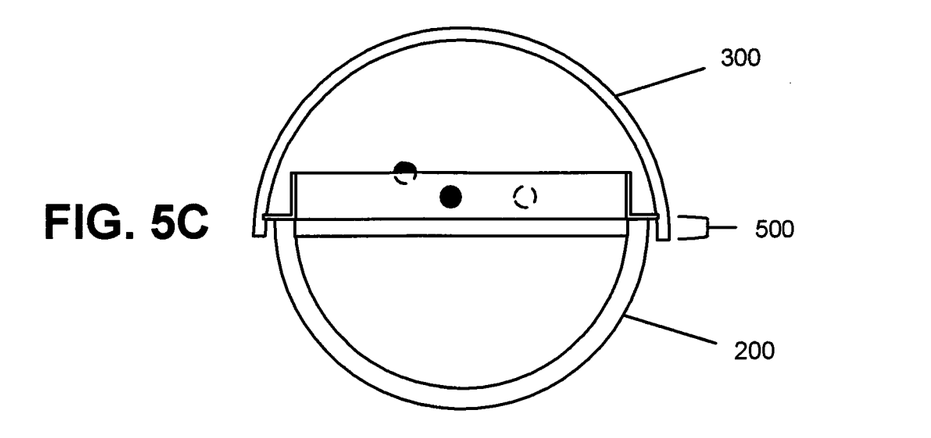

FIG. 5A, FIG. 5B and FIG. 5C depict alternative embodiments where the bottom section 200 and the top section 300 are mated in different configurations. In FIG. 5A, the bottom section 200 and the top section 300 are the same width. In FIG. 5B, the top section 300 is wider than the bottom section 200 such that the liquid tray 304 is formed by the cover 204 while the side-gutters 310 overhang. In FIG. 5C, the side-gutters 310 are also recessed by a distance 500 within the mouth of the optically transparent dome 308 to form a recessed lip. The bottom section 200 fits within the recessed lip to provide a sturdy connection.

Figure 6:
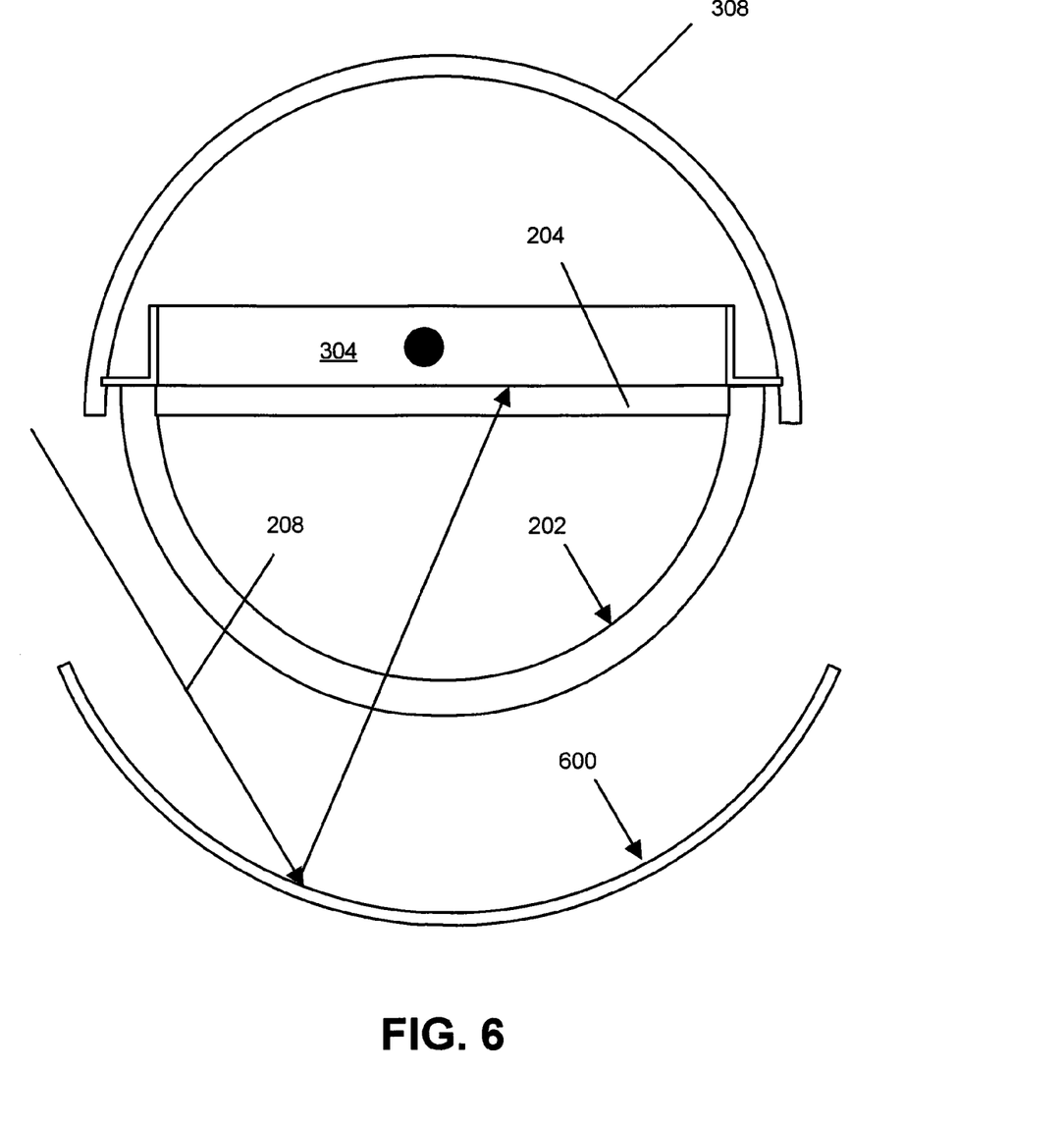
FIG. 6 is a cross section of the system showing the use of a parabolic mirror.

In one embodiment, a parabolic mirror is used to direct light toward the cover 204. FIG. 6 depicts the light 208 as it is directed by a parabolic mirror 600 and subsequently transmitted through the optically transparent bottom surface 202 to heat water in the liquid tray 304. In another embodiment, the light 208 is directed by an array of concave lenses. One such embodiment is shown in FIG. 7A.

Figure 7A:
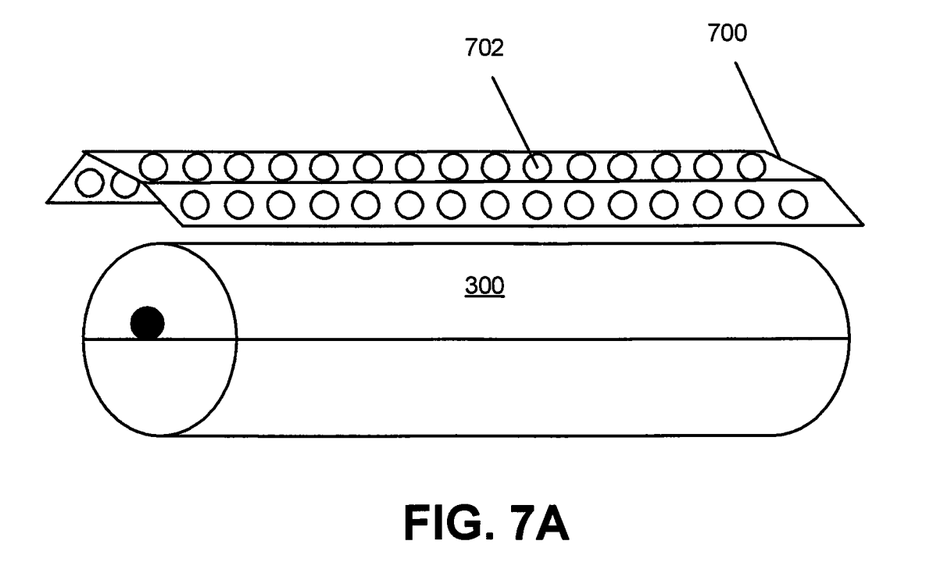
FIG. 7A is a perspective view of the system showing the use of an array of lenses.
Figure 7B:
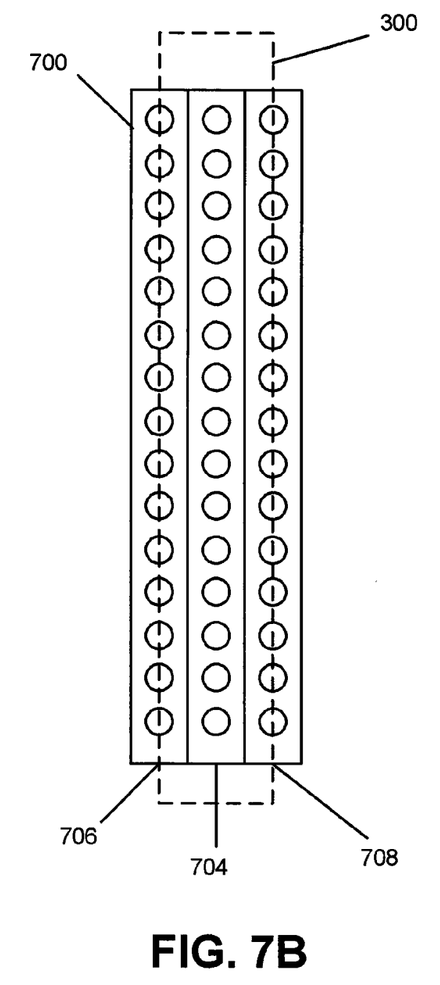
Figure 7C:
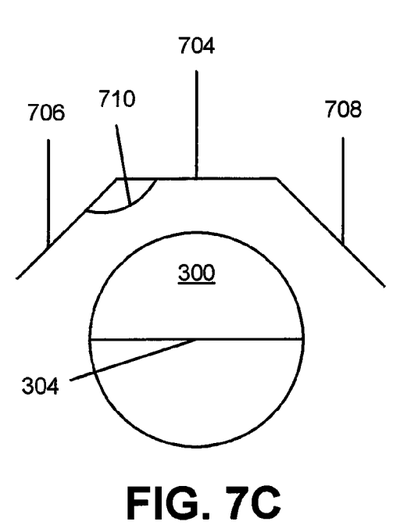
FIG. 7C is an end view of the array of lenses.

FIG. 7A is a profile view that depicts an array 700 of lenses 702 disposed above the top section 300. In the embodiment of FIG. 7A the top section 300 is optically transparent and the concave lenses 702 direct light into the top section 300 to facilitate evaporation. FIG. 7A provides a top view of the array 700. The array comprises a central panel 704 that is flanked by two side-panels 706, 708. As shown in FIG. 7B and FIG. 7C, each panel expends parallel the longitudinal axis of the top section 300. The central panel 704 extends parallel to the liquid tray 304 while the side-panels 706, 708 are offset from the plane of the central panel 704 by an angle 710 such that light is focused on the top section 300. The magnitude of the angle 710 varies with the diameter of the top section 300 but generally is less than 180° and greater than 90°. In one embodiment, lenses 702 are Fresnel lenses, concave lenses, concave parabolic Fresnel lenses, linear Fresnel lenses or convex parabolic Fresnel lenses.

Figure 8A:
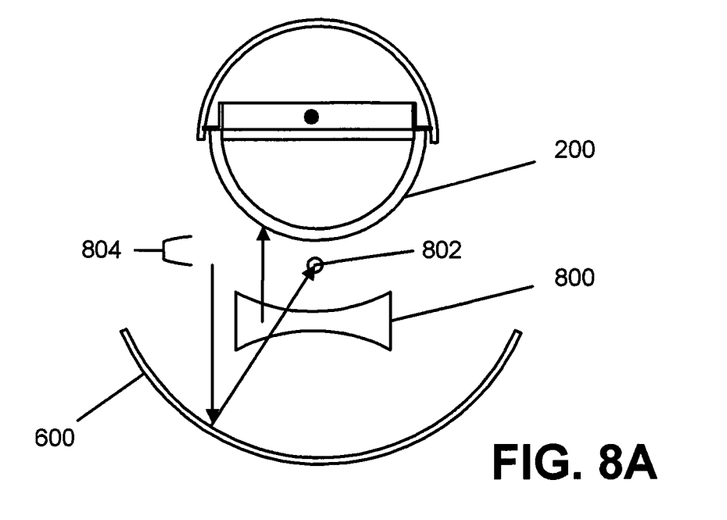
FIG. 8A is a cross section of the system showing the use of a lens between the parabolic mirror and the bottom section.

FIG. 8A depicts an embodiment that uses at least one lens between the parabolic mirror 600 and the bottom section 200. In one such embodiment, an array of lenses is utilized similar to the array 700. For simplicity of illustration, only a single lens is shown in the side view of FIG. 8A. The lens 800 is a parabolic biconcave lens that has a focal length that directs light to a focal point 802. The focal point 802 is spaced at a distance 804 from the bottom section 200.

Figure 8B:
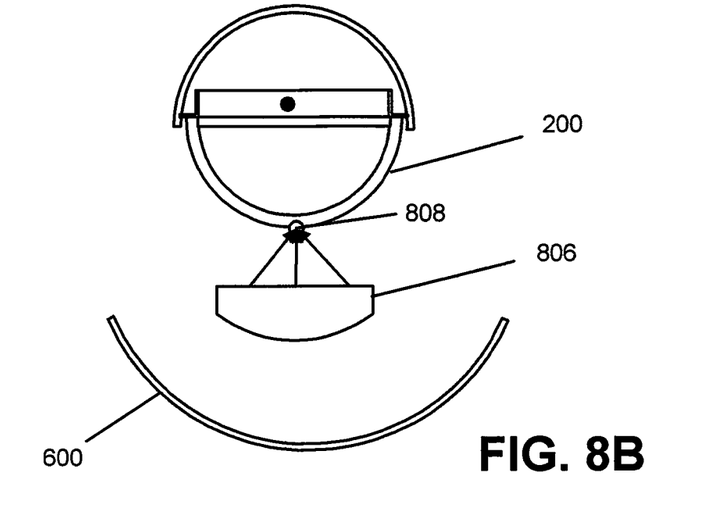
FIG. 8B is a cross section of another system showing the use of a lens between the parabolic mirror and the bottom section.

FIG. 8B depicts another embodiment that uses at least one lens between the parabolic mirror 600 and the bottom section 200. In FIG. 8B, a parabolic convex lens 806 is used that has a focal length that directs light to a focal point 808. The lens 806 is placed such that the focal point 808 coincides with the lower surface of the bottom section 200.

Figure 9:
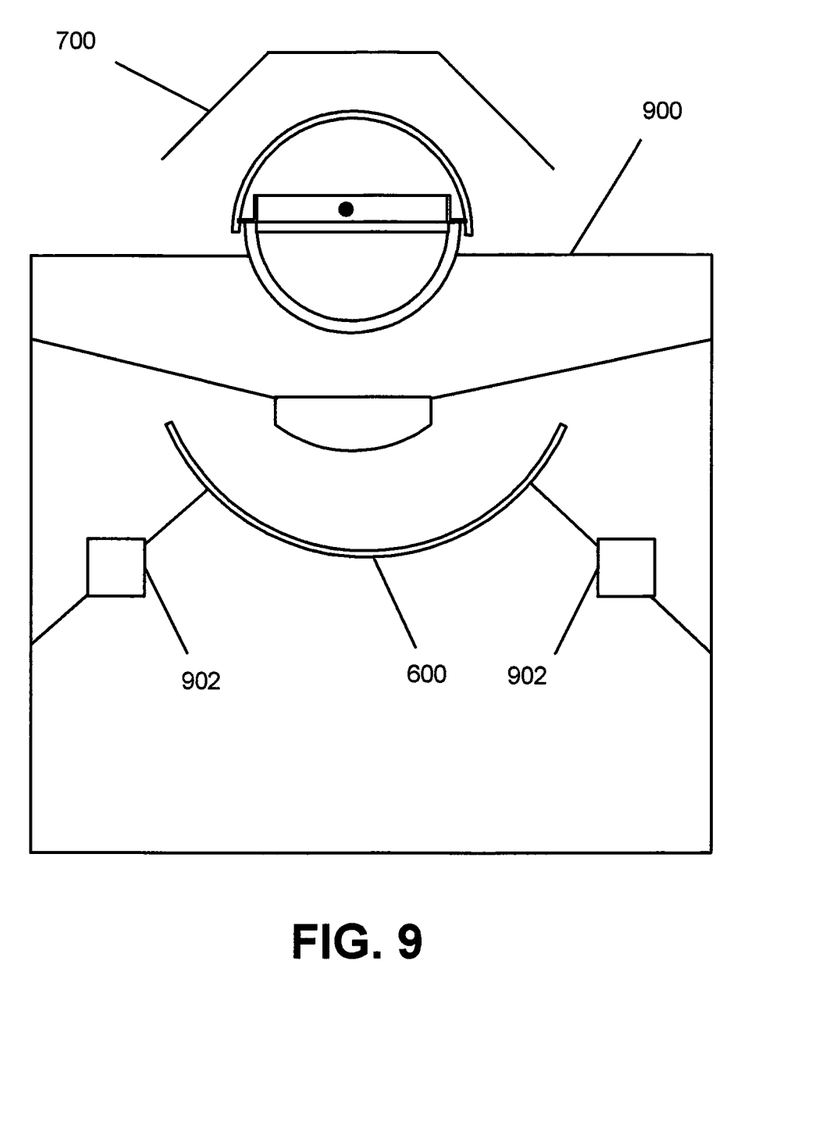
FIG. 9 is an end view of a system showing a frame with a motor for moving the parabolic mirror.

As shown in FIG. 9, in one embodiment, the water purifying device 100 is supported on a frame 900 that allows rotation of the parabolic mirror 600 to track sunlight. The frame 900 provides a supporting scaffold that permits light to contact the device. In one embodiment, the frame 900 comprises at least one self-adjusting motor 902. The self-adjusting motor 902 may be solar powered and is configured to re-position the parabolic mirror 600 to track the sun as the sun moves.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for purifying water by solar power, the device comprising:
   a bottom section and a top section, each being horizontal cylindrical segments contacting one another along a respective flat edge to provide an elongated cylinder;
   the bottom section comprising a cover that defines the flat edge of the bottom section that is sealed to an optically transparent bottom surface to provide an evacuated area that has a pressure of less than one atmosphere;
   the top section comprises a liquid tray that defines the flat edge of the top section, at least one side-gutter that directs water that condenses on an interior surface of the top section to an output port, the liquid tray further comprising an input port for adding water into the liquid tray.

2. The device as recited in claim 1, further comprising a parabolic mirror disposed below the optically transparent bottom surface.

3. The device as recited in claim 1, further comprising a water reservoir that supplies water to the input port.

4. The device as recited in claim 3, further comprising a water flow regulator that regulates flow of water from the water reservoir to the input port.

5. The device as recited in claim 1, the liquid tray further comprising an overflow port that is disposed above the input port and above the output port, but below a wall that defines the side-gutter.

6. A device for purifying water by solar power, the device comprising:
   a bottom section and a top section, each being horizontal cylindrical segments contacting one another along a respective flat edge to provide an elongated cylinder;
   the bottom section comprising a cover that defines the flat edge of the bottom section that is sealed to an optically transparent bottom surface to provide an evacuated area that has a pressure of less than one atmosphere;
   the top section comprises a liquid tray that defines the flat edge of the top section, the liquid tray being flanked by side-gutters that direct water that condenses on an interior surface of the top section to a front-gutter and through an output port, the side-gutters and the front-gutter at least partially circumscribing the liquid try, the liquid tray further comprising an input port for adding water into the liquid tray.

7. The device as recited in claim 6, the liquid tray further comprising an overflow port that is disposed above the input port and above the output port, but below a wall that defines the side-gutter.

8. The device as recited in claim 6, further comprising a frame supporting the device and a parabolic mirror also supported by the frame, the parabolic mirror being below the bottom section to reflect light to the bottom section.

9. The device as recited in claim 8, further comprising at least one lower lens disposed between the parabolic mirror and the bottom section.

10. The device as recited in claim 9, wherein the lower lens is a Fresnel lens.

11. The device as recited in claim 9, wherein the lower lens is a parabolic biconcave lens.

12. The device as recited in claim 9, wherein the lower lens is a parabolic convex lens.

13. The device as recited in claim 6, wherein the device further comprises at least one lens and the top section has an optically transparent dome, the at least one lens focusing light through the optically transparent dome.

14. The device as recited in claim 13, wherein the at least one lens is a Fresnel lenses.

15. The device as recited in claim 6, further comprising an absorbent material disposed within the liquid tray.

16. The device as recited in claim 6, wherein the optically transparent bottom surface is plastic.

17. The device as recited in claim 6, wherein the optically transparent bottom surface is acrylic.

18. The device as recited in claim 13, wherein the optically transparent dome is acrylic.

19. A device for purifying water by solar power, the device comprising:
    a bottom section and a top section, each being horizontal cylindrical segments contacting one another along a respective flat edge to provide an elongated cylinder;
    the bottom section comprising a cover that defines the flat edge of the bottom section that is sealed to an optically transparent bottom surface to provide an evacuated area that has a pressure of less than one atmosphere;
    the top section comprises an optically transparent dome, a liquid tray that defines the flat edge of the top section, the liquid tray being flanked by side-gutters that direct water that condenses on an interior surface of the optically transparent dome to front-gutter and through an output port, the side-gutters and the front-gutter at least partially circumscribing the liquid try, the liquid tray further comprising an input port for adding water into the liquid tray; an array of lenses disposed above the top section.

* * * * *